United States Patent [19]

Mark

[11] Patent Number: 4,473,685

[45] Date of Patent: Sep. 25, 1984

[54] FLAME RETARDANT NON-DRIPPING POLYCARBONATE COMPOSITIONS EXHIBITING IMPROVED THICK SECTION IMPACT

[75] Inventor: Victor Mark, Evansville, Ind.

[73] Assignee: General Electric Company, Mt. Vernon, Ind.

[21] Appl. No.: 517,968

[22] Filed: Jul. 28, 1983

[51] Int. Cl.³ ............................................. C08L 69/00
[52] U.S. Cl. .......................... 525/146; 260/DIG. 24; 525/468; 528/204
[58] Field of Search ................ 525/146, 468; 528/204

[56] References Cited

U.S. PATENT DOCUMENTS 4,223,100 9/1980 Reinert ............................... 525/146
4,252,916 2/1981 Mark ................................... 525/146
4,299,948 11/1981 Weirauch et al. ................... 528/204

Primary Examiner—Theodore E. Pertilla
Attorney, Agent, or Firm—Martin B. Barancik; Myron B. Kapustij

[57] ABSTRACT

Flame retardant, non-dripping polycarbonate compositions exhibiting good thick section impact comprised of, in admixture:
(i) a minor amount of a fluorinated polyolefin; and
(ii) a carbonate copolymer based on the reaction products of
 (a) a carbonate precursor,
 (b) at least one halogen-free and sulfur free dihydric phenol, and
 (c) at least one halogen-free thiodiphenol.

11 Claims, No Drawings

FLAME RETARDANT NON-DRIPPING POLYCARBONATE COMPOSITIONS EXHIBITING IMPROVED THICK SECTION IMPACT

BACKGROUND OF THE INVENTION

Polycarbonates are well known thermoplastic materials which, due to their many advantageous physical and mechanical properties, find use as thermoplastic engineering materials in many commercial and industrial applications. The polycarbonates exhibit, for example, excellent properties of toughness, flexibility, impact resistance, and high heat distortion temperatures. The polycarbonates and their preparation are disclosed, for example, in U.S. Pat. Nos. 2,964,974; 2,999,835; 3,028,365; 3,334,154; 3,275,601; and 3,915,926.

However, these polycarbonates generally suffer from two disadvantages. The first disadvantage is the low critical thickness values of polycarbonates, i.e., the thickness at which a discontinuity in Izod impact values occurs. These low critical thickness values tend to limit wall thickness of molded polycarbonate to a thickness below the critical thickness. Polycarbonates exhibit notched Izod impact values which are dependent on the thickness of the polycarbonates. Thus, for example, while typical notched Izod impact values for a one-eighth inch thick polycarbonate test specimen are generally in the range of about 16 foot pounds per inch, typical notched Izod impact values for a one-fourth inch thick polycarbonate test specimen are generally in the range of about 2.5 foot pounds per inch. The high Izod values of the one-eighth inch thick polycarbonate test specimen are due to the fact that these specimens are thinner than the critical thickness of the polymer and, therefore, upon impact a hinged or ductile break occurs. The low Izod impact values of the one-fourth inch thick polycarbonate test specimens are due to the fact that these specimens exceed the critical thickness of the polymer and, therefore, upon impact a clean or brittle break occurs.

The second disadvantage of polycarbonates is that they, like most other plastics, are relatively flammable. Thus polycarbonates are generally unsuitable for applications where high temperatures and exposure to flames may be encountered. In order to render the polycarbonates suitable for high temperature or open flame environments they must be modified to be made flame retardant. One of these modifications involves the inclusion a halogenated moiety, such as halogenated diphenol, in the backbone of the carbonate polymer. These halogen containing carbonate copolymers are generally flame retardant. However, the presence of these halogen containing moieties adversely affects the critical thickness values of the polycarbonates. Thus, for example, the critical thickness of a carbonate copolymer containing 5 to 6 percent by weight bromine in the form of a halogenated diphenol is about 130-140 mils.

U.S. Pat. No. 4,043,980 discloses polycarbonate compositions obtained as the reaction products of an aromatic diol, a halogenated phenol, and a carbonic acid coreacted with an aromatic thiodiphenol, which compositions exhibit flame retardancy stated to be the result of the synergism between the sulfur and the halogen present in the compositions. However, this patent teaches the necessity of the presence of a halogen containing moiety in the polycarbonate compositions and states that the resultant flame retardancy is the result of synergism between the sulfur present in the thiodiphenol and the halogen present in the halogenated phenol.

International Application No. WO 82/00468, published Feb. 18, 1982 discloses that polycarbonate compositions can be rendered flame retardant by either admixing with the carbonate polymer a polymer based on a thiodiphenol, or incorporating into the polycarbonate backbone a thiodiphenol residue. While these compositions are quite effective and useful in most applications, they suffer from the disadvantage that relatively large amounts of thiodiphenol, typically from about 23-98 mole percent, must be employed to render said compositions flame retardant. Since thiodiphenol is relatively expensive, as compared with dihydric phenols such as bisphenol-A, its use in relatively large amounts places these flame retardant polycarbonate compositions at an economic disadvantage. Also in some applications, particularly those where the polycarbonate resin is required to exhibit properties of substantially sulfur-free bisphenols, such as bisphenol-A, or where the presence of large amounts of sulfur would be disadvantageous, such large amounts of thiodiphenol are undesirable.

It would thus be very advantageous if flame retardant polycarbonate compositions could be provided which are halogen free and which, consequently, exhibit the properties of halogen-free polycarbonates such as good thick section impact strengths. It would also be very advantageous if flame retardant polycarbonate compositions could be provided which not only exhibit the properties and characteristics of halogen-free polycarbonates, but also exhibit the properties and characteristics of substantially sulfur-free polycarbonates such as good processability and economic competitiveness.

It is, therefore, an object of the instant invention to provide polycarbonates which are flame retardant, are halogen-free, and contain relatively minor amounts of sulfur in the form of thiodiphenol residues.

SUMMARY OF THE INVENTION

Polycarbonate compositions are provided which exhibit good thick section impact strengths and are simultaneously flame retardant and drip-resistant. These compositions are comprised of, in physical admixture, (i) a carbonate resin based on the polymerized reaction products of (a) a carbonate precursor, (b) at least one halogen-free and sulfur-free diphenol, and (c) at least one thiodiphenol; and (ii) a minor amount of a fluorinated polyolefin.

DESCRIPTION OF THE INVENTION

It has surprisingly been discovered that polycarbonate compositions containing a halogen-free polycarbonate resin can be provided which are flame retardant, non-dripping, and exhibit good thick section impact. These polycarbonate compositions are comprised of, in admixture, (i) a halogen-free carbonate resin based on the reaction products of (a) a carbonate precursor, (b) at least one halogen-free and sulfur-free dihydric phenol, and (c) at least one thiodiphenol; and (ii) a minor amount of a fluorinated polyolefin.

The fluorinated polyolefins used in this invention as drip retarding agents are commercially available or may be readily prepared by known processes. They are solids obtained by polymerization of tetrafluoroethylene, for example, in aqueous media with free radical catalysts, e.g., sodium, potassium or ammonium peroxydisulfides at 100 to 1,000 psi at 0°–200° C., and preferably at 20°–100° C. The preparation of some of these fluorinated polyolefins is disclosed in U.S. Pat. No. 2,393,967, which is hereby incorporated herein by reference. While not essential, it is preferred to use these fluorinated polyolefin resins in the form of relatively large particles, e.g., of average particle size of from about 0.3 to about 0.7 mm, mostly about 0.5 mm. These are generally better than the usual polytetrafluoroethylene powders which have particles of from about 0.05 to about 0.5 millimicrons in diameter. It is especially preferred to use the relatively large particle size material because it tends to disperse readily in polymers and bond them together into fibrous material. Such preferred polytetrafluoroethylenes are designated by ASTM as Type 3, and are available commercially from the E. I. du Pont de Nemours & Company under the tradename TEFLON type 6.

The instant compositions contain an amount of fluorinated polyolefin which when admixed with the sulfur containing polycarbonate is effective to enhance the flame retardancy of said compositions and to render said compositions non-dripping. Generally, this is a relatively minor amount and is generally in the range of from about 0.01 to about 1 weight percent, based on the amount of the polycarbonate resin present, and preferably from about 0.01 to about 0.5 weight percent.

The halogen-free and sulfur-free dihydric phenols employed in the practice of the instant invention to produce the halogen-free carbonate resin may be represented by the general formula

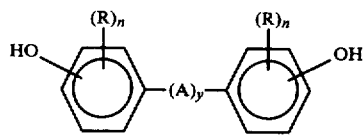

wherein:

A is selected from divalent hydrocarbon radicals containing from 1 to about 16 carbon atoms; —O—; and

R is independently selected from monovalent hydrocarbon radicals containing from 1 to about 15 carbom atoms;

n is independently selected from whole numbers having a value of from zero to four inclusive; and y has a value of either zero or one.

The divalent hydrocarbon radicals represented by A include alkylene radicals, alkylidene radicals, cycloalkylene radicals, and cycloalkylidene radicals. Some illustartive non-limiting examples of alkylene and alkylidene groups represented by A include methylene, ethylene, propylene, propylidene, isopropylidene, butylene, isobutylene, butylidene, amylene, isoamylene, amylidene, isoamylidene, and the like.

When A represents a cycloalkylene or cycloalkylidene radical it is preferred that these cycloalkylene and cycloalkylidene radicals contain from 4 to 7 carbon atoms in the cyclic structure. These preferred cycloalkylene and cycloalkylidene groups may be represented by the general formula

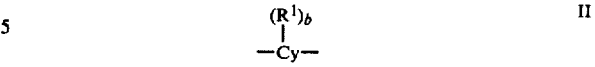

wherein:

Cy is selected from cycloalkylene and cycloalkylidene radicals containing from 4 to about 7 carbon atoms in the cyclic structure;

$R^1$ is independently selected from lower alkyl radicals, preferably lower alkyl radicals containing from 1 to about 5 carbon atoms; and b is a whole number having a value from 0 up to the number of replaceable hydrogen atoms present on Cy, preferably having a value of from 0 to 6 inclusive.

Some non-limiting illustrative cycloalkylene and cycloalkylidene radicals represented by Formula II include, cyclopentylene, cyclopentylidene, cyclohexylene, cyclohexylidene, methylcyclohexylene. methylcyclohexylidene, and the like.

The monovalent hydrocarbon radicals represented by R include alkyl radicals, aryl radicals, aralkyl radicals, and alkaryl radicals.

Preferred alkyl radicals are those containing from 1 to about 10 carbon atoms. Illustrative of these preferred alkyl radicals are methyl, ethyl, propyl, isopropyl, butyl, isobutyl, pentyl, isopentyl, neopentyl, and the like.

Preferred aryl radicals represented by R include those containing from 6 to 12 carbon atoms, i.e., phenyl and naphthyl.

Preferred alkaryl and aralkyl radicals represented by R are those containing from 7 to about 15 carbon atoms.

Preferably R is selected from alkyl radicals containing from 1 to about 10 carbon atoms.

In the dihydric phenol compound represented by Formula I above when more than one R substituent is present they may be the same or different. Where y is zero in Formula I the aromatic rings are directly joined with no intervening alkylene or other bridge. The positions of the hydroxyl groups and R on the aromatic nuclear residues can be varied in the ortho, meta, or para positions and the groupings can be in a vicinal, asymmetrical or symmetrical relationship where two or more ring carbon atoms of the aromatic hydrocarbon residue are substituted with R and hydroxyl group.

Some non-limiting illustrative examples of the dihydric phenols of Formula I include:

2,2-bis(4-hydroxyphenyl)propane (bisphenol-A);
2,4'-dihydroxydiphenylmethane;
bis(2-hydroxyphenyl)methane;
bis(4-hydroxyphenyl)methane;
1,1-bis(4-hydroxyphenyl)ethane;
1,3-bis(3-methyl-4-hydroxyphenyl)propane;
2,2-bis(3-isopropyl-4-hydroxyphenyl)propane;
bis(4-hydroxyphenyl)cyclohexylmethane;
1,1-bis(4-hydroxyphenyl)cyclohexane;
bis(3-ethyl-4-hydroxyphenyl)ether;
bis(4-hydroxyphenyl)ether;
3,3'-dimethyl-4,4'-dihydroxydiphenyl;
p,p'-dihydroxydiphenyl; and the like.

It is, of course, possible to employ mixtures of two or more different dihydric phenols of Formula I in the practice of the present invention. Therefore, whenever the term dihydric phenol is used herein it is to be understood that this term encompasses mixtures of dihydric phenols as well as individual dihydric phenols.

The thiodiphenols useful in the practice of this invention are those represented by the general formula

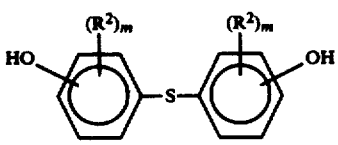

III wherein:

R[2] is independently selected from alkyl, alkaryl, aralkyl, and aryl radicals; and m is independently selected from whole numbers having a value of from 0 to 4 inclusive.

Preferred alkyl radicals represented by R[2] are those containing from 1 to about 10 carbon atoms. Some illustrative non-limiting examples of these preferred alkyl radicals include methyl, ethyl, propyl, isopropyl, butyl, tertiarybutyl, pentyl, neopentyl, hexyl, and the like.

Preferred aryl radicals represented by R[2] are those containing 6 or 12 carbon atoms, i.e., phenyl and naphthyl.

The preferred aralkyl and alkaryl radicals are those containing from 7 to about 15 carbon atoms, e.g., benzyl, ethylphenyl, propylphemyl, etc.

Preferred thiodiphenols of Formula III are those wherein R[2] is independently selected from alkyl radicals.

In the thiodiphenol compounds represented by Formula III when more than one R[2] substituent is present they may be the same or different. The positions of R[2] and the hydroxyl groups on the aromatic nuclear residues can be varied in the ortho, meta, or para positions and the groupings can be in a vicinal, asymmetrical or symmetrical relationship, where two or more ring carbon atoms of the aromatic hydrocarbon residue are substituted with R[2] and hydroxyl groups.

Some illustrative non-limiting examples of the thiodiphenols of Formula III include:
4,4'-thiodiphenol;
2-methyl-4,4'-thiodiphenol;
2,2'-dimethyl-4,4'-thiodiphenol;
2,2'-di-tertiary-butyl-4,4'-thiodiphenol; and the like.

Such thiodiphenols can be prepared by known methods such as those disclosed in U.S. Pat. No. 3,931,335, which is hereby incorporated herein by reference.

It is of course possible to employ mixtures of two or more different thiodiphenols of Formula III in the practice of the instant invention. Therefore, wherever the term thiodiphenol is used herein it is to be understood that this term includes mixtures of two or more different thiodiphenols as well as individual thiodiphenols of Formula III.

The preferred halogen-free thiodiphenols of Formula III are the 4,4'-thiodiphenols.

The carbonate precursor may be a carbonyl halide, a bishaloformate or a diarylcarbonate. The carbonyl halides include carbonyl bromide, carbonyl chloride, and mixtures thereof. The bishaloformates include the bishaloformates of dihydric phenols such as bischloroformates of 2,2-bis(4-hydroxyphenyl)propane, 2,2-bis(4-hydroxy-3,5-dichlorophenyl)propane, hydroquinone, and the like; or the bishaloformates of glycols such as the bischloroformates of ethylene glycol, neopentyl glycol, polyethylene glycol, and the like. Typical of the diarylcarbonates which may be employed are diphenyl carbonate, and the di(alkylphenyl carbonates such as di(tolyl)carbonate. Some other non-limiting illustrative examples of suitable diarylcarbonates include di(naphthyl)carbonate, phenyl tolyl carbonate, and the like.

The preferred carbonate precursors are the carbonyl halides, whith carbonyl chloride, also known as phogene, being the preferred carbonyl halide.

Also included with the scope of the instant invention are the high molecular weight thermoplastic randomly branched polycarbonates. These randomly branched polycarbonates are prepared by coreacting a minor amount of a polyfunctional organic compound with the dihydric phenol compounds of Formula I and the thiodiphenols of Formula III. The polyfunctional organic compounds useful in making the branched polycarbonates are disclosed in U.S. Pat. Nos. 3,635,895 and 4,001,184, both of which are incorporated herein by reference. These polyfunctional compounds are generally aromatic and contain at least three functional groups which may be carboxyl, hydroxyl, carboxylic anhydride, haloformyl, or mixtures thereof. Some illustrative non-limiting examples of these polyfunctional compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic acid anhydride, and the like.

One method which may be utilized in preparing the polycarbonates of the instant invention involves the heterogeneous interfacial polymerization system utilizing an aqueous caustic solution, an organic water immiscible solvent, at least one dihydric phenol of Formula I, at least one thidiphenol of Formula III, a catalyst, a carbonate precursor, and a molecular weight regulator. A preferred heterogeneous interfacial polymerization system is one which utilizes phosgene as a carbonate precursor.

Another useful method for preparing the carbonate polymers of the instant invention involves the use of an organic solvent system wherein the organic solvent system may also function as an acid acceptor, at least one dihydric phenol of Formula I, at least one thiodiphenol of Formula III, a molecular weight regulator, and a carbonate precursor. A preferred method is one wherein phosgene is employed as the carbonate precursor.

Generally, in both of the aforediscussed methods phosgene is passed into the reaction mixture containing at least one dihydric phenol of Formula I and at least one thiodiphenol of Formula III. The temperature at which the phosgenation reaction proceeds may vary from below 0° C. to above 100° C. The reaction proceeds satisfactorily at temperatures from room temperature (25° C.) to about 50° C. Since the reaction is exothermic, therate of phosgene addition may be used to control the reaction temperature.

A suitable acid acceptor may be either organic or inorganic in nature. A suitable organic acid acceptor is a tertiary amine and includes such materials as pyridine, triethylamine, dimethylaniline, tributylamine, etc. The inorganic acid acceptor may be a hydroxide, such as an alkali or alkaline earth metal hydroxide, a carbonate, a bicarbonate, a phosphate, and the like. An inorganic acid acceptor is preferred when an aqueous system is utilized.

The catalysts which may be employed can be any of the well known catalysts which aid the polymerization reaction of the dihydric phenol with the phosgene.

Suitable catalysts include, but are not limited to, tertiary amines, secondary amines, quaternary ammonium compounds, quaternary phosphnoium compounds, amidines, and the like.

The molecular weight regulators employed may be any of the known compounds which regulate the molecular weight of the carbonate polymers by a chain stopping or terminating mechanism. These compounds include, but are not limited to, phenol, tertiarybutyl phenol, and the like.

The high molecular weight aromatic carbonate polymers of the instant invention generally have a weight average molecular weight in the range of from about 5,000 to about 200,000, preferably from about 10,000 to about 100,000, and more preferably from about 25,000 to about 50,000.

The polycarbonates of the instant invention may optionally have admixed therewith certain commonly known and used additives such as, for example, antioxidants; antistatic agents; fillers; ultraviolet radiation absorbers such as the benzophenones, benzotriazoles, benzylidene malonates, and the like; hydrolytic stabilizers such as the epoxides disclosed in U.S. Pat. Nos. 3,489,716, 4,138,379 and 3,839,247, all of which are hereby incorporated herein by reference; mold release agents; color stabilizers such as the organophosphites disclosed in U.S. Pat. Nos. 3,305,520 and 4,118,370, both of which are hereby incorporated herein by reference; and the like.

The carbonate copolymers of the instant invention will generally contain the following repeating structural units:

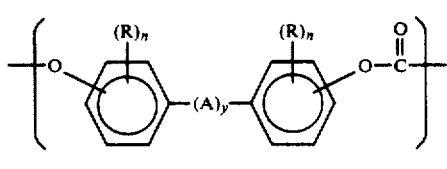

and

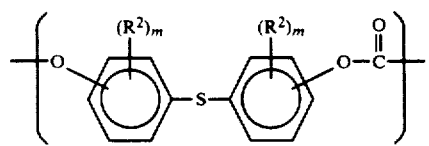

wherein R, R², A, n, y and m are as defined above. The structural units of Formula V will be present in relatively minor amounts. The amount of structural units of Formula V present will be an amount which when said polycarbonate resin is admixed with the fluorinated polyolefin is effective to render said compositions flame retardant. This amount is generally in the range of from about 1 to about 15 mole percent, based on the amount of structural units of Formula IV and Formula V present, and preferably from about 1 to about 10 mole percent, based on the total amount of structural units of Formulae IV and V present.

Rather than containing a carbonate resin of the type described hereinafore, i.e. a copolycarbonate comprised of the reaction products of (i) a halogen-free and sulfur-free dihydric phenol of Formula I, (ii) a halogen-free thiodiphenol of Formula III, and (iii) a carbonate precursor, hereinafter referred to as Polymer A, the instant compositions may contain blends of Polymer A and a polycarbonate derived from (i) a halogen-free and sulfur-free dihydric phenol of Formula I, and (ii) a carbonate precursor, hereinafter referred to as Polymer B. The instant compositions may thus contain blends of (a) at least one halogen-free and sulfur-containing copolycarbonate derived form (i) a dihydric phenol of Formula I, (ii) a thiodiphenol of Formula III, and (iii) a carbonate precursor, i.e. Polymer A,; and (b) at least one halogen-free and sulfur-free polycarbonate derived from (i) a dihydric phenol of Formula I, and (ii) a carbonate precursor, i.e. Polymer B.

When the compositions contain blends of Polymers A and B, the amount of the structural units of Formula V present in Polymer A may be increased above the 15 mole percent limit specified above, providing, that the amount of structural units of Formula V present in the final blends, i.e. the blends of Polymers A and B, is in the range of from about 1 to about 15 mole %, and preferably in the range of from about 1 to about 10 mole %, based on the total amount of structural units IV and V present in Polymers A and B.

Thus, for example, Polymer A may contain 30 mole percent of structural units of Formula V. This Polymer A is then blended with Polymer B which contains only structural units of Formula IV. The final blend contains amounts of Polymer A and Polymer B such that the mole % of structural units of Formula V present in the blend, based on the total amount of structural units of Formulae IV and V present in Polymer A and structural units of Formula IV present in polymer B, is in the range of from about 1 to about 15, and preferably from about 1 to about 10 mole percent.

Generally, if the compositions contain less than about 1 mole % of structural units of Formula V there will be no appreciable improvement in flame retardancy of the compositions. If, on the other hand, the compositions contain more than about 15 mole percent of the structural units of Formula V, the compositions will begin to be economically adversely affected, and the concentration of sulfur in these compositions will begin to render these compositions unsuitable for applications where the presence of sulfur is undesirable, or where polycarbonates exhibiting the characteristics of sulfur-free and halogen-free polycarbonates, such as those based on bisphenol-A, are required.

It is, of course, possible to utilize polycarbonate blends comprised of Polymer B, and a polycarbonate containing up to about 95 mole % repeating structural units of Formula V, as long as the amount of structural units V in the total composition is in the range of 1 to 15 mole %. Thus, for example, it would be possible to utilize a blend comprised of 85% resin B and 15% of a resin containing up to about 95 mole % repeating structural units of Formula V.

Generally the blends comprised of Polymer A and Polymer B contain from about 20 to about 80 weight percent of at least one Polymer A, and from about 80 to about 20 weight percent of at least one Polymer B. These blends may be conveniently prepared by simply physically admixing the two polymers together, either as powders or as pellets.

The instant compositions may also optionally contain certain commonly known and used additives such as, for example, antioxidants; antistatic agents; inert fillers such as talc, clay, mica, and glass; mold release agents; ultraviolet radiation absorbers such as the benzophenones, benzotriazoles, and benzylidene malonates; hydrolytic stabilizers such as the epoxides disclosed in U.S. Pat. Nos. 3,489,716, 4,138,379 and 3,839,247, all of which are incorporated herein by reference; and color stabilizers such as the organophosphites disclosed in U.S. Pat. Nos. 3,305,520 and 4,118,370, both of which are incorporated herein by reference.

PREFERRED EMBODIMENT OF THE INVENTION

The following examples are presented to more fully and clearly illustrate the invention. Although the examples set forth the best mode presently known to practice the invention they are intended to be and should be considered as illustrative rather than limiting the invention. In the examples, all parts and percentages are by weight unless otherwise specified.

The following examples illustrate polycarbonate compositions falling outside the scope of the instant invention and are presented for comparative purposes only.

EXAMPLE 1

This example illustrates a prior art copolycarbonate which is derived from bisphenol-A and thiodiphenol. This polycarbonate composition contains no fluorinated polyolefin.

Into a mixture of 2283 grams of bisphenol-A (10 moles), 218 grams (1 mole) of 4,4'-thiodiphenol, 5700 grams of water, 9275 grams of methylene chloride, 32 grams of phenol and 10 grams of triethylamine are introduced, at ambient temperature, 1180 grams of phosgene over a period of 97 minutes while maintaining the pH of the two phase system at about 11, i.e. pH 10–12.5, by stimultaneously adding a 25% aqueous sodium hydroxide solution. At the end of the phosgene addition period the pH of the aqueous phase is 11.7 and the bisphenol-A content of this phase is less than 1 part per million as determined by ultraviolet analysis.

The methylene chloride phase is separated from the aqueous phase, washed with an excess of dilute (0.01N) aqueous HCL and then washed three times with deionized water. The polymer is precipitated by steam and dried at 95° C. The resultant polycarbonate is fed to an extruder, which extruder is operated at about 500° C. and the extrudate is comminuted into pellets.

The pellets are then injection molded at about 600° C. into test bars of about 5 in. by ½ in. by ⅛ in. thick. These test bars are subjected to the test procedure set forth in underwriters' Laboratories, Inc. Bulletin UL-94, Burning Test for Classified Materials. In accordance with this test procedure, materials that pass are rated V-0, V-I or V-II based on the results of 5 specimens. The criteria for each V (for vertical) rating per UL-94 is briefly as follows:

"V-0": Average flaming and/or glowing after removal of the igniting flame shall not exceed 5 seconds and none of the specimens shall drip flaming particles which ignite absorbent cotton.

"V-I": Average flaming and/or glowing after removal of igniting flame shall not exceed 25 seconds and the glowing does not travel vertically for more than ⅛" of the specimen after flaming ceases and glowing is incapable of igniting absorbent cotton.

"V-II": Average flaming and/or glowing after removal of the igniting flame shall not exceed 25 seconds and the specimens drip flaming particles which ignite absorbent cotton.

In addition, a test bar which continues to burn for more than 25 seconds after removal of the igniting flame is classified, not by UL-94, but by standars of the invention, as "burns". Further, UL-94 requires that all test bars in each test group must meet the V-type rating to achieve the particular classification. Otherwise, the 5 test bars receive the rating of the worst single bar. For example, if one bar is classified as V-II and the other four are classified as V-0, then the rating for all 5 bars is V-II.

EXAMPLE 2

This example also illustrates a prior art copolycarbonate which is derived from bisphenol-A and thiodiphenol. This polycarbonate composition contains no fluorinated polyolefin.

The procedure of Example 1 is repeated with a mixture of 1712.5 grams (7.5 moles) of bisphenol-A and 545.7 grams of 4,4'-thiodiphenol (2.5 moles).

Test bars are prepared substantially in accordance with the procedure of Example 1, and these test bars are subjected to test procedure UL-94.

EXAMPLE 3

This example illustrates a prior art polycarbonate resin which does not contain either the thiodiphenol moieties or the fluorinated polyolefin.

Into a mixture of 2283 grams of pure bisphenol-A, 5700 grams of water, 9275 grams methylene chloride, 32 grams phenol and 10 grams triethylamine are introduced, at ambient temperature, 1180 grams of phosgene over a period of 97 minutes while maintaining the pH of the two phase system at about 11, i.e. 10–12.5, by simultaneously adding a 25° aqueous sodium hydroxide solution. At the end of the addition period, the pH of the aqueous phase is 11.7 and the BPA content of this phase is less than 1 part per million as determined by ultraviolet analysis.

The methylene chloride phase is separated from the aqueous phase, washed with an excess of dilute (0.01N) aqueous HCl and then washed three times with deionized water. The polymer is precipitated by steam and dried at 95° C. The resultant pure bisphenol-A polycarbonate is fed to an extruder, which extruder is operated at about 550° F. and the extrudate is comminuted into pellets.

The pellets are then molded into test bars in accordance with the procedure set forth in Example 1, and the test bars are subjected to test procedure UL-94.

EXAMPLE 4

This example illustrates a polycarbonate composition falling outside the scope of the instant invention in that the composition contains fluorinated polyolefin but the polycarbonate does not contain any thiodiphenol residues.

To 1470 grams of the powdered polycarbonate resin prepared substantially in accordance with the procedure of Example 3 are added 30 grams of TEFLON 6. This mixture is then thoroughly stirred. The resultant mixture contains 2 weight percent TEFLON. This mixture is then molded into test bars substantially in accordance with the procedure of Example 1 and the test bars are subjected to test procedure UL-94.

The following example illustrates compositions falling within the scope of the instant invention.

EXAMPLE 5

Into a mixture of 1826.4 grams of bisphenol-A, 436.6 grams of 4,4'-thiodiphenol, 6 liters of water, 7 liters of methylene chloride, 31.1 grams of phenol, and 20.2 grams of triethylamine is introduced phosgene at the rate of 30 grams/minute for a period of 30 minutes, while maintaining the pH of the two phase system at about 11 by the simultaneous introduction of a 25% aqueous NaOH solution. At the end of the phosgene addition the bisphenol-A content of the aqueous phase is less than 1 part per million as determined by ultraviolet analysis.

The methylene chloride phase is separated from the aqueous phase, washed with an excess of dilute (0.01N) aqueous HCl and then washed three times with deionized water. The polymer is precipitated by steam and dried at 95° C. The resultant copolycarbonate has an intrinsic viscosity (IV) in methylene chloride at 25° C. of 0.533 dl/g.

650 grams of this copolycarbonate, in powder form, are thoroughly mixed with 850 grams of the polycarbonate powder prepared substantially in accordance with the procedure of Example 3. The resultant polycarbonate blend contains about 8.67 mole percent of the thiodiphenol residue. To this polycarbonate blend are added 1.5 grams of TEFLON 6 to give a composition containing 0.1 weight percent TEFLON. The resultant composition is then formed into test bars substantially in accordance with the procedure of Example 1 and the test bars are subjected to the test procedure UL-94.

Additionally the resins of Examples 3, 4 and 5 are molded into test squares of about 2 in.×2 in.×⅛ in. thick. Impact measurements by the notched Izod test were determined according to ASTM D-1238. The results of these tests, as well as the UL-94 tests, are set forth in Table I.

TABLE I

| EXAMPLE NO. | MOLE % THIODI-PHENOL | WEIGHT % TEFLON | NOTCHED IZOD (ft. lb.) | UL-94 |
|---|---|---|---|---|
| 1 | 9 | 0 | — | V-II |
| 2 | 25 | 0 | — | V-0 |
| 3 | 0 | 0 | 2.11 | BURNS |
| 4 | 0 | 2 | 1.86 | BURNS |
| 5 | 8.6 | 0.1 | 2.13 | V-0 |

As illustrated by the data in Table I the instant compositions are flame retardant, non-dripping, and exhibit good thick section impact. The flame retardant and non-dripping characteristics of the instant compositions are obtained using much lower concentrations of thiodiphenol than required in the prior art compositions to achieve comparable results. Thus, at similar concentrations of thiodiphenol but absent the fluorinated polyolefin the prior art compositions of Example 1 are V-II. In order to have a V-0 rating a polycarbonate composition which does not contain any fluorinated polyolefin must contain relatively large amounts of thiodiphenol, i.e. the 25 mole % of Example 2. The presence of relatively large amounts of fluorinated polyolefin in the non-thiodiphenol containing polycarbonate compositions of Example 2 does nothing to improve the flame retardancy of said compositions.

However, as illustrated by the data for Example 5, the use of relatively small amounts of fluorinated polyolefins renders polycarbonate compositions containing minor concentrations of thiodiphenol flame retardant and non-dripping. Thus, the instant invention provides compositions which are flame retardant, non-dripping, and exhibit good thick section impact. All of this is achieved using substantially smaller amounts of thiodiphenol than would be required to obtain the same results absent the fluorinated polyolefin.

It will thus be seen that the objects set forth above, among those made apparent from the preceding description, are efficiently attained, and since certain changes may be made in carrying out the above processes and in the composition set forth is intended that all matters contained in the above description shall be interpreted as illustrative and not in a limiting sense.

What is claimed is:

1. Flame retardant substantially nondripping polycarbonate compositions exhibiting good thick section impact comprised of, in admixture:
   (i) at least one polycarbonate resin derived from
      (a) a carbonate precursor
      (b) at least one halogen-free and sulfur-free dihydric phenol, and
      (c) from about 1 to about 15 mole percent, based on the amount of said dihydric phenol, of at least one halogen-free thiodiphenol; and
   (ii) from about 0.01 to about 1 weight percent, based on the amount of said polycarbonate resin, of at least one fluorinated polyolefin.

2. The compositions of claim 1 wherein said amount of said fluorinated polyolefin is from about 0.01 to about 0.5 weight percent.

3. The compositions of claim 1 wherein said amount of said thiodiphenol is from about 1 to about 10 mole percent.

4. The compositions of claim 1 wherein said halogen-free and sulfur-free dihydric phenol is represented by the formula

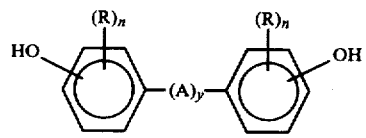

wherein:

A is selected from divalent hydrocarbon radicals, the —O— radical, and the

radical;

R is independently selected from monovalent hydrocarbon radicals;

n is independently selected from whole numbers having a value of from 0 to 4 inclusive; and y is one or zero.

5. The compositions of claim 4 wherein said divalent hydrocarbon radicals represented by A are selected from alkylene, alkylidene, cycloalkylene, and cycloalkylidene radicals.

6. The compositions of claim 4 wherein said monovalent hydrocarbon radicals represented by R are selected from alkyl, aryl, alkaryl, and aralkyl radicals.

7. The compositions of claim 6 wherein R is independently selected from alkyl radicals.

8. The compositions of claim 1 wherein said thiodiphenol is represented by the general formula

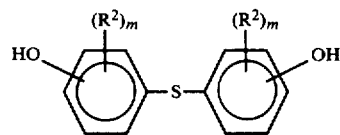

wherein:

$R^2$ is independently selected from alkyl, aryl, aralkyl, and alkaryl radicals; and m is independently selected from whole numbers having a value of from 0 to 4 inclusive.

9. The compositions of claim 8 wherein $R^2$ is independently selected from alkyl radicals.

10. The compositions of claim 1 which further contain at least one polycarbonate resin derived from (a) a carbonate precursor, and (b) a halogen-free and sulfur-free dihydric phenol.

11. The compositions of claim 10 wherein said halogen-free and sulfur-free polycarbonate resin is present in an amount of from about 20 to about 80 weight percent, based on the total amount of polycarbonate resins present.

* * * * *